J. CARROLL.
Hand-Seeder.
No. 18,802.
Patented Dec. 8, 1857.
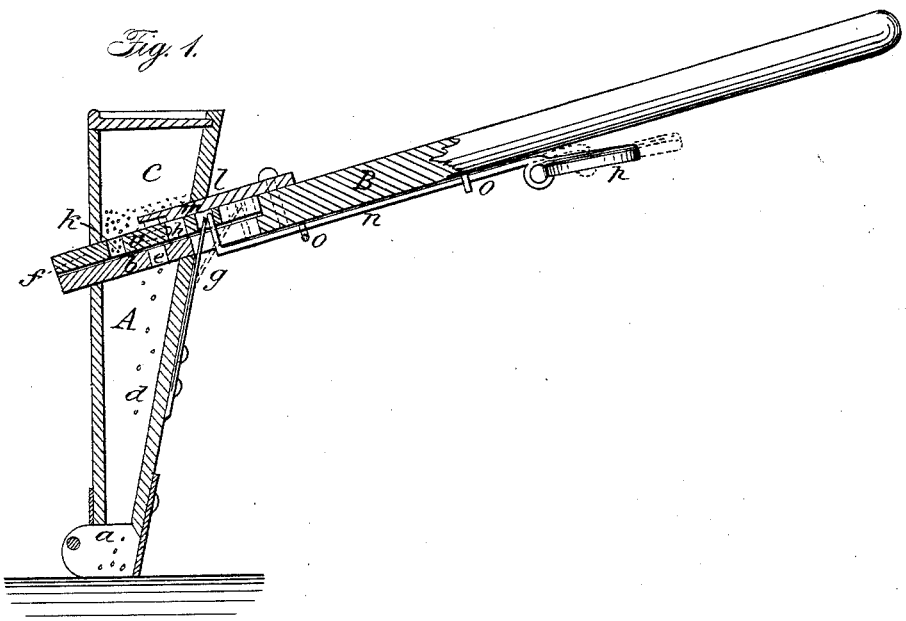
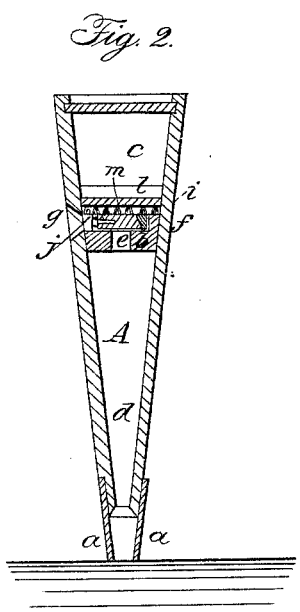

UNITED STATES PATENT OFFICE.

JAMES CARROLL, OF LA PORTE, OHIO.

IMPROVEMENT IN SEED-PLANTERS.

Specification forming part of Letters Patent No. 18,802, dated December 8, 1857.

*To all whom it may concern:*

Be it known that I, JAMES CARROLL, of La Porte, in the county of Lorain and State of Ohio, have invented a new and Improved Hand Seed-Planting Machine; and I do hereby declare that the following is a full, clear, and exact description of the same, reference being had to the annexed drawings, making a part of this specification, in which—

Figures 1 and 2 are vertical central sections of my improvement, the two planes of section intersecting each other at right angles.

Similar letters of reference indicate corresponding parts in the two figures.

The nature of my invention consists in the employment of the handle B, furnished with a discharge-passage, in combination with a slide, *f*, which has a hand-trigger, *n*, and with the puculiar conducting-tube A *c*, which is furnished with shares *a a*, in the manner and for the purpose presently to be described.

To enable those skilled in the art to fully understand and construct my invention, I will proceed to describe it.

A represents a taper quadrilateral box, the lower end of which is shod with a metal socket having two plates, *a a*, attached to form a furrow-share, the plates *a a* being placed in V form. The box A may be constructed of wood, and a wooden handle, B, is attached to the box A, said handle passing through the box, the portion within it being of sufficient width to form a partition, *b*, within the box, the upper part, *c*, of which is a hopper and the lower part, *d*, a conducting-spout.

Through the partition *b* an opening, *e*, is made, and a groove is made in the partition to receive a slide, *f*, in the end of which a spring, *g*, fits, said spring being attached to the back side of the box A. The slide *f* has oblong slot *h* made through it, and a slide, *i*, is fitted in said slot, the slide being secured in the slot at any desired point by means of a set-screw, *j*. The slide *i* is shorter than the slot *h*, and an opening, *k*, is allowed at the lower or outer end of the slot, which opening may be enlarged or contracted by adjusting slide *i*. The spring *g* has a tendency to keep the opening *k* forward of the hole *e* in the partition.

Over the back part of the slide *i* a plate, *l*, is secured. The front end of this plate has a brush cut-off, *m*, attached. To the back end of the slide *f* a wire or rod, *n*, is attached. This wire passes through guide-loops *o o*, attached to the handle B, the outer end of the rod having a loop or strap, *p*, attached. Through one side of the box A a hole, *q*, is made, by which the set-screw *j* is rendered accessible and the adjustment of the slide *i* made with the greatest facility. The handle B is grasped by the operator, the implement being drawn along and the rod *n* drawn out at the spots where the seed is to be dropped, the seed contained in hole or opening *k* dropping out through the hole *e* in the partition when the opening or hole *k* registers with it. The seed is conveyed by the spout *d* into the furrow made by the share.

I am aware that reciprocating slides have been previously used to distribute seeds, &c., and also am aware that adjustable slides *i* have also been previously used. I therefore do not claim these parts separately or in themselves considered; but

Having thus described my invention, what I claim as new, and desire to secure by Letters Patent, is—

The employment of the handle B, furnished with a discharge-passage, in combination with a slide, *f*, which has a hand-trigger, *n*, and with the peculiar conducting-tube A, which is furnished with shares *a a*, substantially as set forth.

JAMES CARROLL.

Witnesses:
 DANIEL TIERNEY,
 ABIJAH SHELDEN.